United States Patent [19]

Okada et al.

[11] 4,450,492
[45] May 22, 1984

[54] INTERLOCKING GEAR CONTROL MECHANISM IN MAGNETIC TAPE RECORDING/PLAYING APPARATUS

[75] Inventors: Hitoshi Okada; Kazuki Takai; Katsumi Yamaguchi, all of Saitama, Japan

[73] Assignee: Clarion Co., Ltd., Tokyo, Japan

[21] Appl. No.: 315,810

[22] Filed: Oct. 28, 1981

[51] Int. Cl.³ .................... G11B 15/66; G11B 21/22
[52] U.S. Cl. .................................. 360/105; 360/96.5
[58] Field of Search .............. 360/105, 96.5, 96.6, 360/75, 137

[56] References Cited

U.S. PATENT DOCUMENTS

| | | | |
|---|---|---|---|
| 3,902,193 | 8/1975 | Hapke | 360/96.6 |
| 3,987,486 | 10/1976 | Ito et al. | 360/105 X |
| 4,014,041 | 3/1977 | Cicatelli | 360/105 X |
| 4,071,859 | 1/1978 | Sami | 360/105 X |

*Primary Examiner*—John H. Wolff
*Attorney, Agent, or Firm*—Flynn, Thiel, Boutell & Tanis

[57] ABSTRACT

An interlocking gear control mechanism, comprising a driven gear engaged with a drive rotary member and a rack member operated as engaged with the driven gear, and a gear lock piece to put said driven gear in engagement with the drive rotary member, an elastic member to give the gear lock piece a force for engagement of the driven gear with the drive rotary member, and a portion provided on the gear lock piece to eliminate the engagement in a condition where the rack member has completely attained its full stroke.

3 Claims, 14 Drawing Figures

INTERLOCKING GEAR CONTROL MECHANISM IN MAGNETIC TAPE RECORDING/PLAYING APPARATUS

BACKGROUND OF THE INVENTION

1. Field of the Invention

The present invention relates to an interlocking gear control mechanism used in a magnetic tape recording/playing apparatus, and more particularly to a gear control mechanism suitable for use in a magnetic tape recording/playing apparatus to utilize the drive force of a motor in order to effect such mechanism operations as loading of a magnetic tape pack.

2. Description of the Prior Art

In the conventional magnetic tape recording/playing apparatuses, it is practically rare that loading of a magnetic tape pack, forward movement of head plate, etc. are effected as driven by the motor; in some of the conventional magnetic tape recording/playing apparatuses, after the tape pack is taken to the innermost position within the apparatus, it is carried over a remaining short stroke into the recording/playing position by an intermittent action of the portion of a tape pack loading gear which is provided with no teeth. This conventional system is advantageous in that the tape pack can be disengaged from the gear when engagement is unnecessary. However, since the tape pack loading mechanism is operated with a cam disposed coaxially with the rotating intermittent gear, the operating stroke cannot be so large; in particular, in case the loading of tape pack needs a large stroke, the tape pack setting mechanism has to have a very large volume. Further, a system in which a rack plate and gear are used for this purpose of tape pack loading has been proposed; in this case, however, in order to start the loading operation and stop the operation after the tape pack is set in place, (1) a motor for exclusive use for the operation is provided which is energized or deenergized to start or stop the operation, or (2) the attractive force of an electromagnetic plunger is utilized to let the rack plate engage with the gear, thus starting the loading operation, and the electromagnetic plunger is deenergized so as to lose its attractive force, thus disengaging the rack plate from the gear to stop the loading operation, or (3) a clutch mechanism is provided between the motor drive and the rack drive gear so that the rack plate having moved a necessary stroke is made to slip by the clutch mechanism. However, in the case where the motor for special use for the loading operation is employed, no disengagement is made between the rack plate and gear. Consequently, when the rack plate is returned for resetting the tape pack, the motor is a kind of load so that the rack plate is not smoothly moved. Further, the provision of an exclusive-use motor results in a larger loading mechanism and thus higher manufacturing costs. In the case where the electromagnetic plunger is employed, the loading mechahism is of a large volume and the costs of manufacture are consequently expensive, as in the case of the exclusive-use motor being provided. In the case that the clutch mechanism is adopted, the mechanism itself causes the loading operation to be unstable, and since the clutch mechanism always makes the rack plate slip, which causes an extra load to the drive motor and the durability of the motor and the other to be degraded. In addition, adverse affects such as wow are caused to take place to the mechanical properties. The clutch mechanism is apt to act as load to the operation of returning the rack plate when the tape pack is reset.

SUMMARY OF THE INVENTION

Accordingly, the present invention has an object to overcome the above-mentioned drawbacks of the conventional systems, by providing a novel and improved interlocking gear control mechanism for use in magnetic tape recording/playing apparatus, in which a simple mechanism is utilized to engage or disengage the rack plate with or from the drive gear withoutput employing any expensive exclusive-use motor, electromagnetic plunger or the like.

The foregoing and other objects and advantages of the present invention will be better understood from the ensuing description made by way of example of the preferred, but non-limitative, embodiments of the present invention with reference to the accompanying drawings.

BRIEF DESCRIPTION OF THE DRAWINGS

In the above Figures, the mechanism in position of tape playing and in position of ejection are appropriately illustrated; in particular, FIGS. 3 and 4, and 7 and 8 show the mechanism in tape playing position with solid lines, while FIGS. 5 and 6, and FIGS. 9 and 10 illustrate the mechanism in position of tape pack ejection with solid lines. Also the operation of the tape pack moving members of the mechanism is appropriately shown with imaginary lines (two dotdash line);

Figure 1:
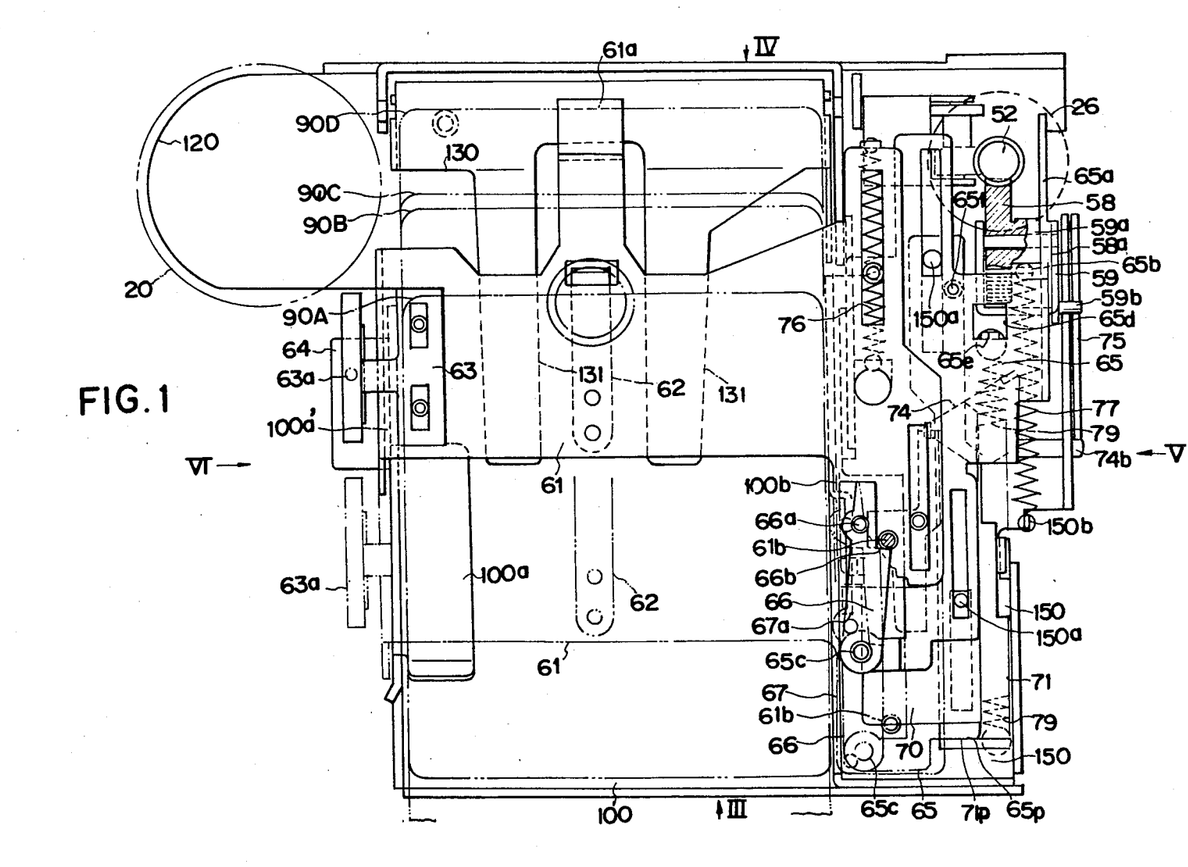
FIG. 1 is a partially cut-off, plan view of a magnetic tape recording/playing apparatus in which the loading mechanism according to the present invention is adopted.
Figure 3:
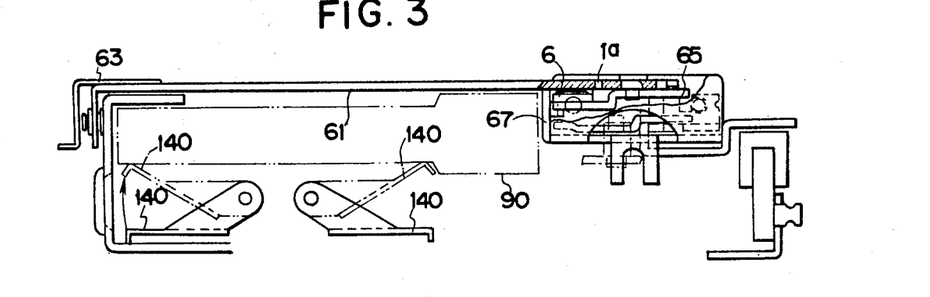
FIG. 3 is a partially cut-off, side elevation of the mechanism viewed from the arrow III in FIG. 1.
Figure 4:
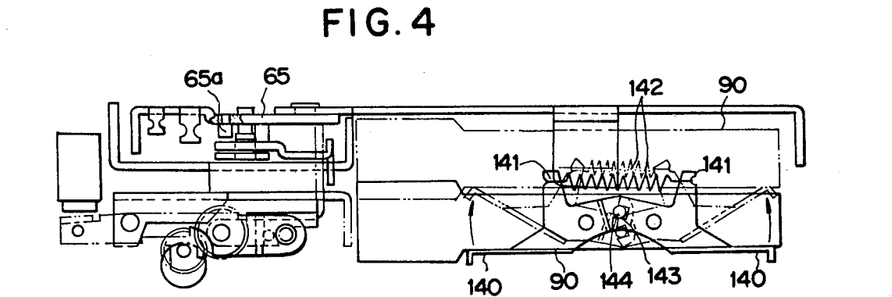
FIG. 4 is a side elevation of the apparatus viewed from the arrow IV in FIG. 1.
Figure 8:
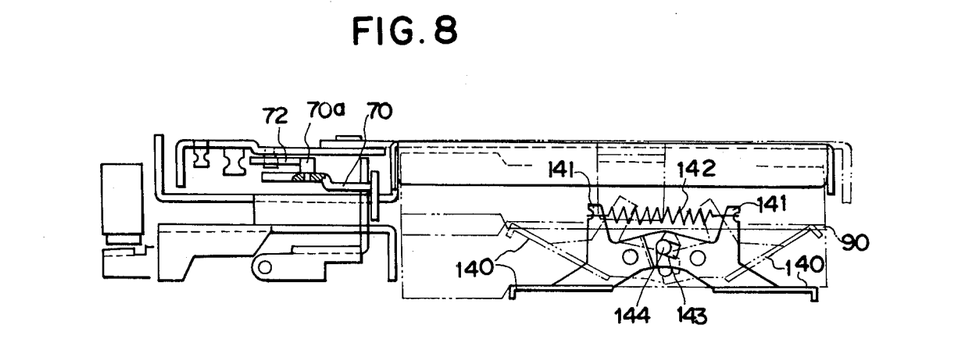
FIG. 8 is a side elevation of the eject plate and pivotal latch.

Referring now to FIG. 1, a tape deck or magnetic tape recording/playing apparatus is generally shown at the reference numeral 100; within this deck 100 and on the front side of which slidably provided is a sliding frame 61 between a guide 100a' on one side of the deck 100 and a side piece 67 of a support base 150 on the other side of the deck 100. The sliding frame 61 is made to slide by a tape pack being inserted. The sliding frame 61 has formed at the front end thereof a catch 61a which is bent downward. This catch 61a is to rest on the front end of the tape pack inserted between said guide 100a' and side piece 67, thus the sliding frame 61 is pushed to slide inwardly inside the tape deck 100 against the elasticity of a spring 76 provided between the tape deck 100 and a rack plate 65. On one side of the sliding frame 61 provided is an elastic piece 63 of which a pusher 63a is to act on a start switch 64 installed on the lateral side of the deck 100. When the tape pack 90 is pushed in to the position of tape pack front end 90c shown in FIG. 1, the start switch 64 is closed to start a motor 20 fixed to a mount seat 120 in one innermost position of the tape deck 100. A tape pack guide or setting frame 130 is pivotably fixed at the base end thereof to the innermost wall of the tape deck 100 with respect to the sliding frame 61. Further a pair of holding members 140 is provided within the tape deck 100 as shown in FIG. 3. These holding members 140 are operated symmetrically as interlocked to each other under the action of a spring provided extending between engagement members 141 shown in FIGS. 4 and 8 and because of the engagement between a bifurcated end of one 143 of one of the engagement members 141 and an engagement pin 144 on the other engagement member 141. In the normal state, the holding members 141 are kept slanted as shown with imaginary (two dot-dash) line in FIG. 3; 4 or 8. In this condition, the tape pack 90 inserted into the tape deck is accepted and supported at the bottom thereof horizontally at a level nearly same as the tape pack insertion hole in the tape deck as shown with imaginary line (two dot-dash line) in FIGS. 3 and 4. After the tape pack 90 is inserted into the tape deck 100, it is guided by the tape pack guide or setting frame 130 as will be described later; as shown with solid line in FIG. 4 and with imaginary line (two dot-dash line) in FIG. 8, the holding members 140 are pivoted down so that the tape pack 90 is kept horizontal and raised upward into place for tape recording or playing within the tape deck 100. To smoothly set the tape pack, the tape pack guide or setting frame 130 has finger-shaped extensions 131 which is somewhat elastic because of their structure. Further, there is provided on the rear face of the sliding frame 61 another elastic support piece 62 of which the end engages in reel hole in the tape pack 90 which is thus held by the sliding frame 61. In this way, the tape pack is carried along with the sliding frame 61 at time of automatic loading.

Figure 2:
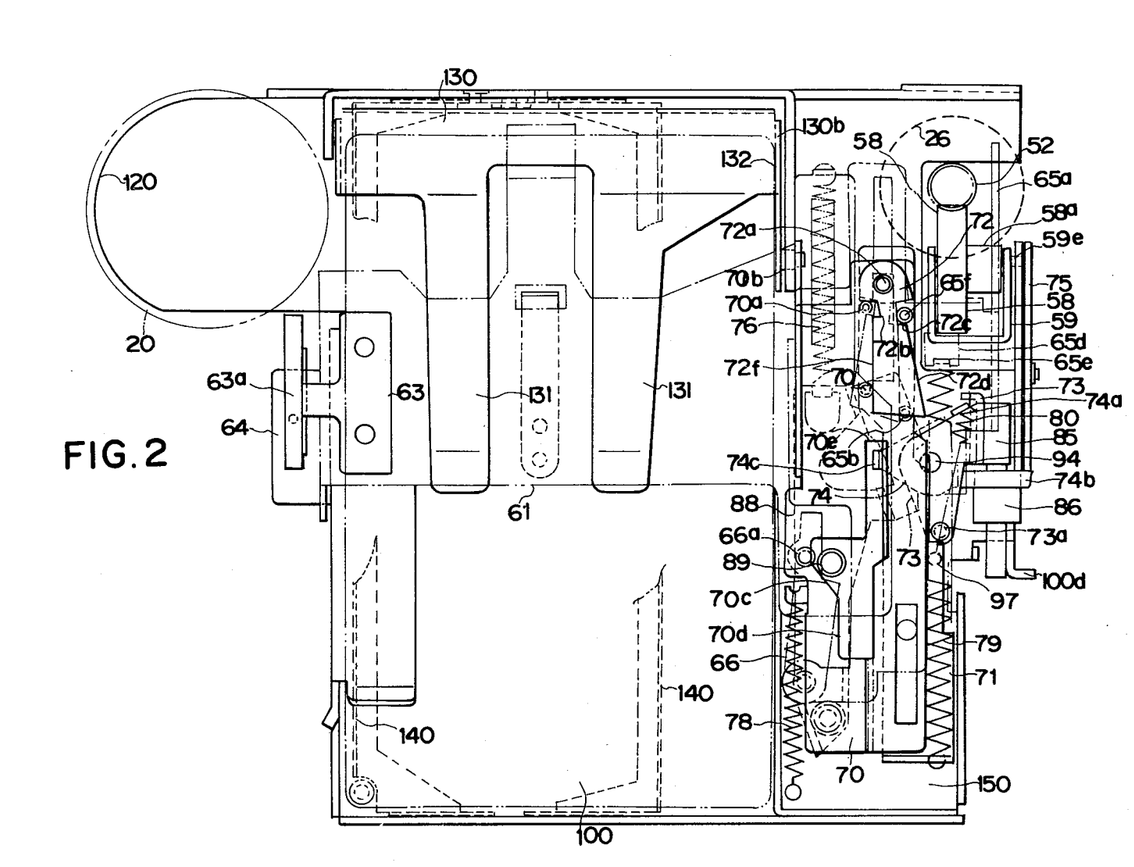
FIG. 2 is a plan view of the mechanism in FIG. 1 with the sliding frame, locking piece and rack plate being removed.
Figure 5:
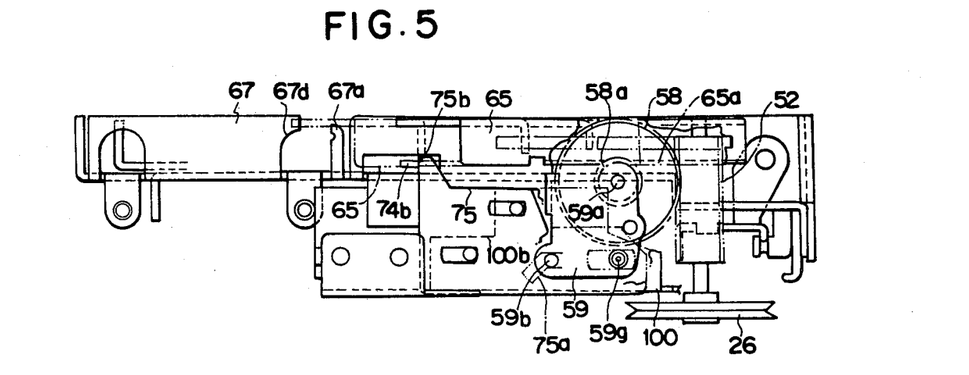
FIG. 5 is a side elevation of the apparatus viewed from the arrow V in FIG. 1.
Figure 6:
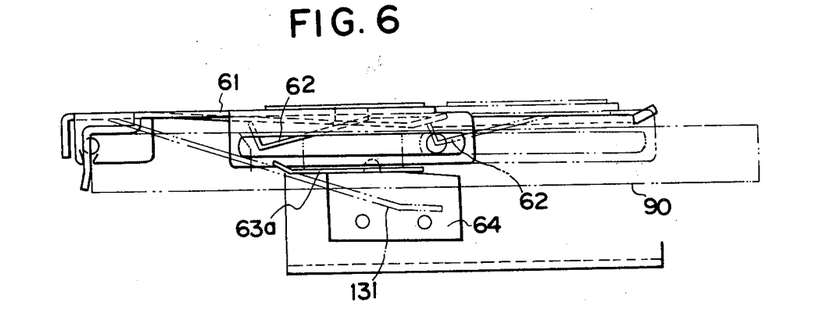
FIG. 6 is a side elevation of the apparatus viewed from the arrow VI in FIG. 1.
Figure 7:
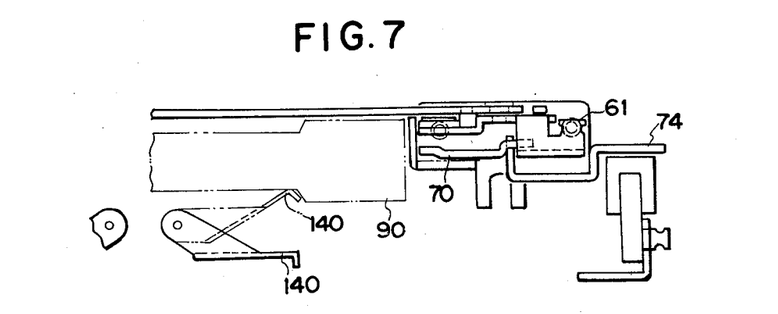
FIG. 7 is a side elevation of the lock-off plate.

Further a rotating member 26 such as pulley which is driven through a belt by means of the previously-mentioned motor 20 is provided as integrally assembled with a worm 62 in the innermost corner of the tape deck 100 as shown in FIGS. 1 and 2; a gear wheel 58 on which a pinion 58a is integrally formed as shown in FIG. 2 is in mesh with the worm 52. The gear wheel 58 is rotatably mounted on horizontal shaft 59a of a gear support frame 59 as shown in FIG. 1. The pinion 58a engages a lateral rack portion of a rack plate 65 provided so as to be slid by guides 150a on a support block 150, as seen in FIG. 5. Further there is provided a spring 77 between an abutment 65b formed on one end of the rack plate 65 and an abutment 150b of the support block 150.

The above-mentioned support frame 59 is pivotably fitted at the mount shaft 59g thereof to the support 100f of the tape deck 100. As seen in FIG. 5, the gear wheel 58 is mounted by means of said horizontal shaft 59a above the mount shaft 59g. Provided by the side of the mount shaft 59g is an engagement piece 59b which, as seen also in FIG. 9, engages in a cam hole 75a located in the intermediate portion of a gear lock piece 75 slidably provided as attached to the support 100f. Provided between the front side of the gear lock piece 75 and a blocking member 100d on the tape deck 100 is a spring 81 which always forces the gear lock piece 75 so as to slide leftward as viewed in the plane of FIG. 9. The gear support frame 59 is always so forced by the cam hole 75a of the gear lock piece 75 through the engagement piece 59b that it is rotated clockwise about the mount shaft 59g in the plane of FIG. 5 or 9. There are provided with respect to this gear lock piece 75 a power lock piece 73 and lock-off plate 74 shown in FIG. 2 and further detailed in FIG. 12, which are to appropriately control the operation of the gear lock piece 75.

In the support block 150, a power plate 71 and eject plate 70 are further assembled to the rear face of the rack plate 65 as shown in FIG. 2. To the rear face of the intermediate portion of the power plate 71 mounted is the power lock piece 73 along with the lock-off plate 74 by means of a pivot 90 to the support block 150. This power lock piece 73 and lock-off plate 74 are further detailed in FIG. 12. These members 73 and 74 both are pivotably supported at the middle portions thereof, and their one end is protruded on the lateral side of the power plate 71 as shown in FIG. 2. The power lock piece 73 has mounted at one end thereof an engagement piece 73a which faces a stepped portion 71s formed in the lateral edge of the power plate 71, and the same power lock piece 73 has formed on the other end a depending portion 73c folded downward; the end of this depending portion 73c is provided with a blocking member 73d. There is provided a tension spring 80 between the blocking member 73d and an engagement piece 97 provided on the support block 150. The lock-off plate 74 is positioned below the power lock piece 73 and has provided at the end thereof a folded protrusion 74c so formed as to engage the extension of an opening 70d in the eject plate 70 and to accomodate the movement of the extension. The other end of the lock-off plate 74 has an operating protrusion 74b which is bent stepwise and extended and of which the end faces a protrusion 75b of the gear lock piece 75. Further, the lock-off plate 74 has an engagement member 74a which engages the gear lock piece 75 at the intermediate lateral portion thereof, thus the lock off plate 74 is operated by the power lock piece 73. The depending portion 73c of the power lock piece 73 is provided with a core 85 which faces the attractive plunger 86. Since the power lock piece 73 is forced clockwise by the spring 80, the plunger 86 when energized attracts the core 85, thus securing the power lock piece 73. When the plunger 86 is deenergized, the power lock piece 73 is unfixed. Further, since the power lock piece 73 is given a counterclockwise moment by the power plate 71, it pushes the gear lock piece 75 through the lock-off plate 74 when the plunger 86 is deenergized, and lets the gears 52 and 58 be disengaged from each other until the ejection is completed.

There is mounted in front of the rack plate 65 a lock piece 66 with the pivot 65c which is extended and bent as shown in FIG. 1. The lock piece 66 has provided at the moving end thereof an engagement piece 66a and has formed on the lateral side thereof a blockage step 66b. Said engagement piece 66a is so disposed as to face the lateral side 67 formed, by folding, from the one side of the support block 150. At the intermediate portion of the lateral side 67 formed is a bent step 67a which acts on the engagement piece 66a in the course of sliding of the lock piece 66. The blockage step 66b is so disposed as to face a pin 61b provided as protruding from the rear face on the other side of the sliding frame 61.

As having been described in the foregoing, the lock piece 66 adopted in the illustrated embodiment of the present invention has such a construction as permit a special over-push operation in order to avoid deterioration of insertion feeling due to load variation taking place because the tape pack is to be set in more than one step, and to permit rough insertion of the tape pack 20 without the shock acting on the interlocking gears. Generally speaking, where the tape pack is inserted or loaded into this kind of tape recording/playing apparatus by means of various members as interlocked, if the tape pack feeding is made in more than one step, the insertion feeling is considerably degraded, which will be described later. Usually, a remarkably great load variation occurs at the moment when the tape pack is transferred from one to another step in the course of insertion. Such load variation causes the insertion feeling to be degraded and the tape pack not to smoothly be inserted or set in place. In case a required locking is made over a stroke with which the pin 61b shown with imaginary line (two dot-dash line) in FIG. 1 is pushed in to the position of it indicated with solid line, even if the sliding frame 61 is slightly excessively pushed, the required locking can be attained without any inconvenience. The load applied to the sliding frame 61 with respect to the spring 76 varies only in succession without any particular degradation of the insertion feeling even if the sliding frame is excessively pushed in as described in the above. By thus enabling over-push of the sliding frame 61 beyond the blockage step 66b of the lock piece 66 between the sliding frame and lock piece, if the tape pack 90 is inserted and pushed into the sliding frame 61 with a considerably great force, this operating force acts on the sliding frame 61 and is damped by the spring 76, thus resulting in no further affect of the operating force on the members operated as interlocked by means of the lock piece 66. Namely, the operating force is made to act on the small teeth interlocked as in mesh with each other between the gear members or rack members, thus protecting the small interlocking teeth against break or damage. By providing the above-mentioned smooth insertion and applying no excessive force to the teeth in mesh, a smooth and accurate insertion of the tape pack can be done in a magnetic tape recording/playing apparatus employing a multi-stage tape pack loading mechanism.

On the support block 150, as seen in FIG. 2, there are assembled the power plate 71, power lock plate 73 and eject plate 70 to the rear face of the rack plate 65. The power plate 71 and the rack plate 65 are made to appropriately slide together by a spring 79 provided between the fixture 65e at the edge of opening 65d in the rack plate 65 and the base end of the power plate 71.

Figure 12:
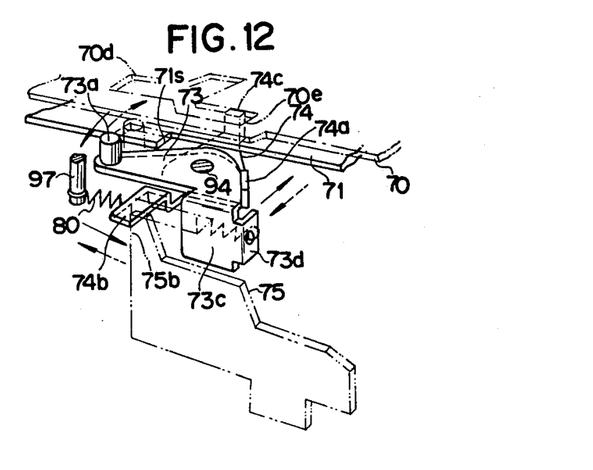
FIG. 12 is a perspective view showing the relation of the power lock piece with the lock-off plate.
Figure 13:
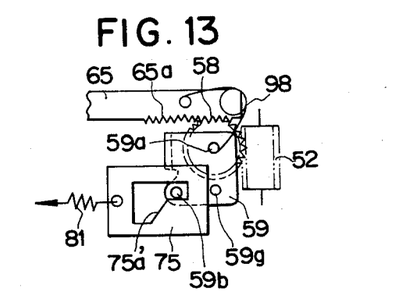
FIGS. 13 and 14 show variations of the lock-off mechanism disposed between the rack plate and gear support frame.
Figure 14:
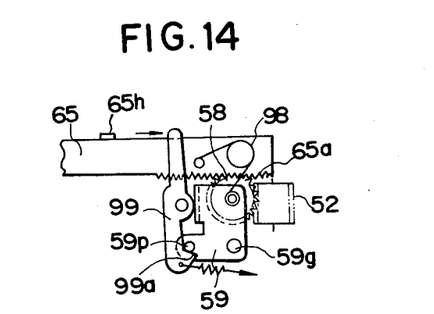

The gear lock piece 75 in the illustrated embodiment may have the structure shown in FIG. 13 or 14. Namely, a reverse spring 98 is used between the gear support frame 59 and the rack plate 65, and in the variation shown in FIG. 13, a relatively large cam 75a' as shown is formed on the gear lock piece 75. As the rack plate 65 is made to slide, the acting direction of the reverse spring 98 is reversed, thus permitting to change over the engagement between the worm 52 and worm wheel 58 without the necessity of using the previously-mentioned lock-off plate 74. In the variation shown in FIG. 14, the reverse spring 98 is similarly adopted and a lock piece 99 as single piece is used while in the embodiment illustrated in FIGS. 1 to 12 the gear lock piece 75 and lock-off plate 74 are used in combination. In this case, a pin 59p fixed on one side of the gear support frame 59 rests on a lock portion 99a of the lock piece 99 to lock the gear 58 and worm 52 in engaged relation which is to be eliminated by the abutment 65h of the rack plate 65 which slides forward.

Figure 11:
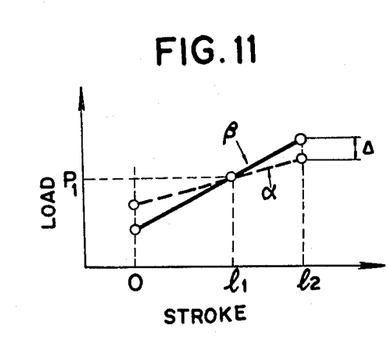
FIG. 11 is an explanatory drawing showing the property of the spring used between the power plate and rack plate.

In the present invention, a special consideration is taken to the above-mentioned spring 79; for sufficient action of ejection, the spring 79 must have a considerable large elasticity. In the present invention, the spring 79 of such a large elasticity is used which is as long as possible, and provided as extending between the front end of the power plate 71 and the fixture 65e near the end of the rack plate 65. As shown in FIG. 11, the comparison in work load P1 for stroke l1 between a long spring $\alpha$ and short one $\beta$ proves that in case an operating stroke l2 to these springs $\alpha$ and $\beta$ is taken, the short spring $\beta$ needs a force larger by $\Delta$ than that required by the long spring. In the illustrated embodiment in which the tape drive motor 20 is also used to force the spring in this connection, it is appropriately avoided that the motor output becomes insufficient because of the elasticity of the spring 79 and is stopped.

Figure 9:
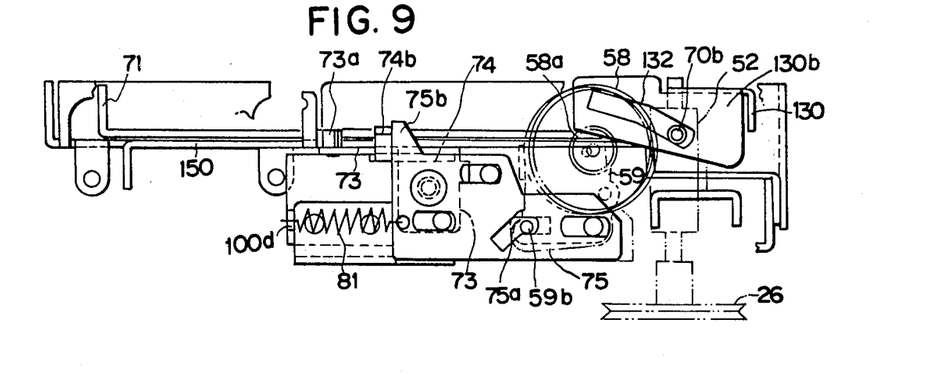
FIG. 9 is a side elevation of the gear lock plate, showing the layout of the plate and associated members.
Figure 10:
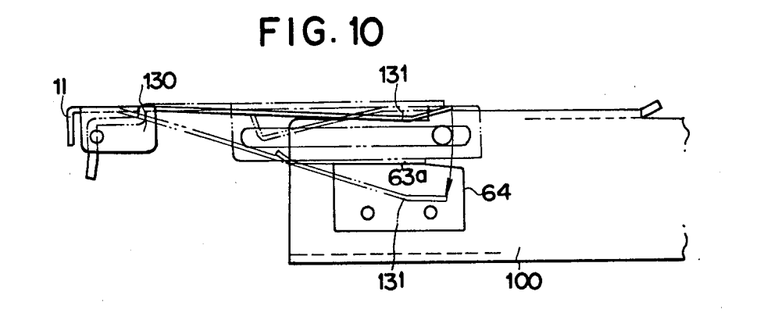
FIG. 10 is a side elevation of the guide plate, showing the operation thereof.

The mechanism according to the present invention has been described for its construction in the foregoing. This mechanism functions as described below:

In the illustrated embodiments of the present invention, the ejection condition is such that the members are positioned in relation to each other as indicated with imaginary lines (two dot-dash line) in FIG. 1 and FIGS. 3 thru 10; namely, in the ejection state, the power plate 71 and rack plate 65 are forced in contact with each other at their base ends 71p and 65p by the spring 79 as shown in FIG. 1, while the rack plate 65 is forced by the spring 77. The sliding frame 61 on the rack plate 65 is drawn out by the spring 76 to the position indicated with the imaginary line in FIG. 1. The eject plate 70 has its abutment 70a engaged with the left-hand engagement portion 72b (in the Figure) of the pivot lock piece 72 as the pivot lock piece 72, subject to the action of the pin 65f of the rack plate 65 when the rack plate slides, is pivoted about the pivot 72a as indicated with imaginary line in FIG. 2. Thus, the cam portion 70c of the cam hole 70d in the eject plate 70 acts on a pivot 89 to retreat a head shift member 88 from the insertion area of the tape pack (or tape cassette) 90, thereby providing a state in which the tape pack may be moved upward in a later loading operation. Further, the worm 52 and worm wheel 58 shown in FIG. 1, 5 or 9 are generally in mesh at their tooth tops with each other; in this condition, the pin 59b of the gear support frame 59 on which the worm wheel 58 is fixed is positioned in the slanted portion of the engagement hole 75a in the gear lock piece 75 as shown in FIG. 9.

In this state, when a tape pack is loaded in the tape deck, the gear lock piece 75, which is so forced by the spring 81 as to slide leftward in FIG. 9, acts at the cam hole 75a thereof on the gear 58 in the gear support frame 59; then the gear 58 is engaged with the worm 52. Thus, as the worm 52 is rotated as driven by the motor, the worm 52 and worm wheel 58, having so far been in mesh at the tooth tops thereof with each other, now get into a complete mesh with each other, and the pin 59b enters the upper horizontal portion of the cam hole 75a as shown in FIG. 9 to maintain the complete engagement between the worm and worm wheel. Consequently, the rack plate 65 is made to slide by the motor rotated worm wheel, and thus the tape pack 90 is automatically loaded in place-within the magnetic tape recording/playing apparatus. After completion of the tape pack loading, the end 70e of the engagement hole in the eject plate 70 pushes the protrusion 74c on the lock-off plate 74 which in turn will be pivoted counterclockwise. Thus the protrusion 74b pushes the gear lock piece 75 to displace the pin 59b, having so far been in locked engagement from the horizontal bent portion of the cam hole 75a, now to the slanted portion of the latter. The gear support frame 59 is thus rotable counterclockwise about the mount shaft 59g, with the result that the gear 58 is disengaged from the worm 52. In case of the tape pack ejection, the attractive plunger 86 is deenergized so that the counterclockwise rotational moment (from the power plate 71) to the power lock piece 73 overcomes the moment by the resetting spring 80 of the power lock piece 73, thus making the power lock piece 73 pivot counterclockwise. At this time, the lock-off plate 74 acts on the gear support frame 59 in such direction that the gears 52 and 58 are disengaged from each other. Accordingly, these gears 52 and 58 are kept off each other until the ejection is completed (power plate 71 returns to the ejection condition above described) even if the eject plate 70 is returned. It is obvious that once the gear 58 and worm 52 are disengaged from each other as in the above, even when they are forced toward and into contact with each other under the action of the spring 81, they will not enter the complete engagement relation as at the time of tape drive. At the time of tape drive, the drive gear pushes the driven gear with the rotational force. When these gears are disengaged from each other, even if each of these gears has no rotational inertia, only the drive gear is pivoted somewhat because the drive force remains on the drive gear. Accordingly, even when a force is applied to the drive and driven gears again, they will be just in mesh at the tooth tops thereof with each other.

Here, the above-mentioned automatic loading will be further explained. The power plate 71 gets in contact at the stepped portion 71s thereof with the pin 73a of the power lock plate 73, and the core 85 provided at the depending portion 73c of the power lock plate 73 is attracted by the plunger 86 to fix the power lock plate 73. Under the limited conditions, the counterclockwise pivoting in FIG. 2 or 12 is made so that the power plate 71 cannot go forward any more while only the rack plate 65 is pushed forward together with the sliding frame 61. The rack plate 65 goes forward while the spring 79 is accumulating force of ejection, and arrives at the final lead-in position 90p. The tape pack 90, carried as supported by the elastic support piece 62 in relation to the sliding frame 61, is subject at this final position 90p to the setting action of the cam hole 132 in the tape pack guide or setting frame 130 and the abutment 70b, and set in place for recording or playing. Upon completion of the tape pack loading, the pin 65f on the rack plate 65 has entered the engagement concavity 72c in the pivot lock piece 72, and consequently makes this pivot lock piece 72 pivot as shown with solid line to make disengagement of the pin 70a and engagement concavity 72b from each other. The eject plate 70 is lead out to the position indicated with solid line in FIG. 2 under the action of the spring 78. The eject plate 70 pushes at the engagement hole end 70e thereof the protrusion 74c on the lock-off plate 74 which in turn will be pivoted counterclockwise and push at the protrusion 74b thereof the gear lock piece 75. Thus, the pin 59b having so far been in locked engagement is moved from the horizontal bent portion to slanted portion of the cam hole 75a. The gear support frame 59 is pivotable counterclockwise about the mount shaft 59g, and the gear 58 is disengaged from the complete drive engagement with the worm 52. Especially during the tape playing or recording made with the eject plate 70 drawn out as mentioned in the above, the lock-off plate 74 pushes at the protrusion 74b thereof the gear lock piece 75, which maintains the gear 58 and worm 52 in disengaged state. That is, in this condition of disengagement from the tape pack loading mechanism, the tape is fed as driven by the motor 20 for tape playing or recording.

As described in the foregoing, the eject plate 70 has formed in the cam portion 70c thereof an engagement hole 70d in which engaged is a pivot 89 of the head shift member 88 which shifts the head and pinch rollers. At time of tape pack ejection, the plunger 86 is deenergized and the power lock plate 73 having so far been fixed is rendered pivotable. Accordingly, when the eject plate 70 to be shifted forward with the force accumulated in the spring 79 is actuated, first the head shift member 88 is so moved by the cam portion 70c as to retreat the head and pinch roller from the state of fitting in the tape pack 90. Along with the forward move of the eject plate 70, the pin 70a of the plate 70 enters the left-hand blockage step of the pivot lock piece 72 which in turn will pivot from the state indicated with solid line to the state indicated with imaginary line since it is subject to the clockwise moment by means of the pin 65f. Thus, the pin 65f and engagement concavity 72c are disengaged from each other so that the rack plate 65 is drawn out to the front side under the action of the spring 77 in a direction opposite to that for loading of tape pack. In such case of ejection, the pin 73a vertically extending from the power lock piece 73 is made to pivot counterclockwise by the stepped portion of the power plate 71. The power lock piece 73 pushes the turn-up portion 74a of the lock-off plate 74 which in turn will be pivoted counterclockwise so that even if the eject plate 70 returns, the worm 52 and gear 58 will not get in mesh with each other. Namely, smooth ejection of the tape pack is assured.

As having been explained in the foregoing, according to the present invention, a tape drive motor is also used for loading and ejection of tape pack, or for shifting of the head. After any of such operations is completed, the disengagement between the gears is made for the motor to serve the tape drive. In tape playing, this mechanism using a single motor for both the tape drive and tape pack loading incurs no adverse affect such as wow. Also in case of ejection, the tape pack or cassette can be smoothly ejected. Accordingly, the construction of a magnetic tape recording/playing apparatus as a whole can be simplified and made compact with reduced costs of manufacture.

Further, since the inter-gear disengagement is maintained until the gear control mechanism is completely reset, the gears will not inadvertently get in mesh with each other, thus protecting the gears and other mechanisms against damage and assuring accurate and reliable operation of them.

Therefore, the present invention is highly advantageous in practice.

We claim:

1. A gear control mechanism in a magnetic tape recording/playing apparatus of the type having a magnetic head and capable of receiving a pack of magnetic tape to be driven past said magnetic head, the mechanism comprising:

a motor for driving a said magnetic tape in said apparatus;

a rotary means driven by said motor;

a driven gear to be engaged with said rotary means for driving thereby;

a gear lock member responsive to insertion of a tape pack into said apparatus for interengaging said driven gear with said rotary means so as to drive said driven gear;

a rack member engaged with said driven gear and responsive to driving of the latter due to said insertion of a tape pack for effecting auto-loading operation of the tape pack;

an eject means for ejecting said tape pack loaded into said apparatus; and a disengagement means responsive to completion of said operation of said rack member for disengaging said driven gear from said rotary means and for maintaining the disengagement between said driven gear and said rotary means until completion of the eject operation by said eject means.

2. A mechanism as set forth in claim 1, in which said disengagement means comprises a spring member provided between said driven gear and rack member and responsive to completing of said operation of said rack member for reversing its direction of action and thereby for disengaging said driven gear from said rotary means.

3. A mechanism as set forth in claim 1, including a head shifting member to shift the magnetic head into and out of a magnetic tape engaging position in said magnetic tape recording/playing apparatus, wherein said head shifting member is interlocked with said disengagement means.

* * * * *